United States Patent [19]

Allegro

[11] 4,151,972
[45] May 1, 1979

[54] SEMI-ATTACHED ASHTRAY

[76] Inventor: Joseph Allegro, 731 NE. 69th St., Boca Raton, Fla. 33431

[21] Appl. No.: 809,758

[22] Filed: Jun. 24, 1977

[51] Int. Cl.² .............................................. B60R 11/00
[52] U.S. Cl. ................................ 248/311.1 R; 211/88
[58] Field of Search .................. 248/311.1; 232/43 N, 232/43.5; 131/231, 257; 211/71, 88

[56] References Cited

U.S. PATENT DOCUMENTS

| | | | |
|---|---|---|---|
| 1,894,146 | 1/1933 | Baker | 248/311.1 X |
| 2,202,365 | 5/1940 | Zeman | 248/311.1 |
| 2,617,429 | 11/1952 | Smereck | 131/257 |

FOREIGN PATENT DOCUMENTS 2327330  12/1974  Fed. Rep. of Germany ........... 131/231

*Primary Examiner*—J. Franklin Foss

[57] ABSTRACT

The present invention relates to an ashtray comprising a receptacle assembly and a wall mounting bracket. The receptacle assembly comprises a cup shaped receptacle portion and a solid stem centrally secured thereto at the outer surface thereof. This assembly can be mounted in a counter having a hole therein with the stem removably received within said hole. The wall mounting bracket comprises an elongated square tubing having a pair of diametrically opposed apertures on opposite sides of said tubing and projection ears with holes therein for mounting the bracket to an external supporting wall surface. The assembly is supported by the bracket with the stem removably received within the pair of apertures.

2 Claims, 5 Drawing Figures

U.S. Patent
May 1, 1979
4,151,972
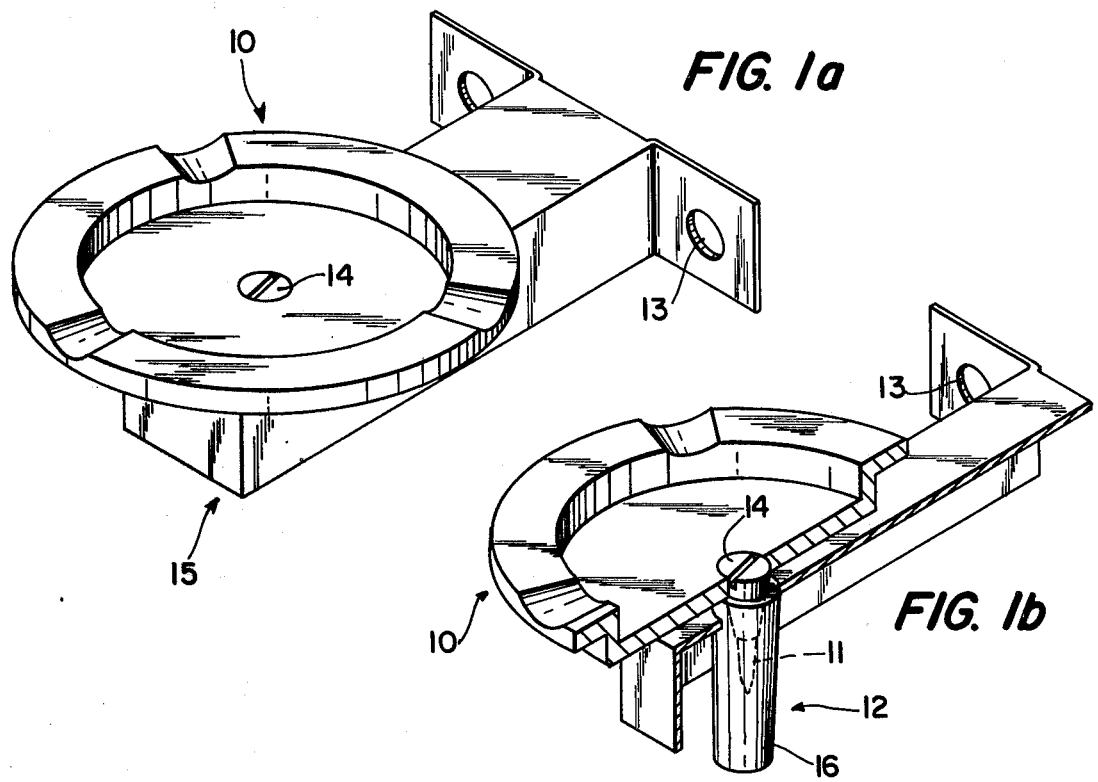
FIG. 1a
FIG. 1b
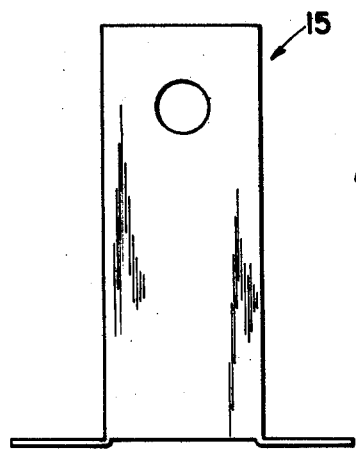
FIG. 2
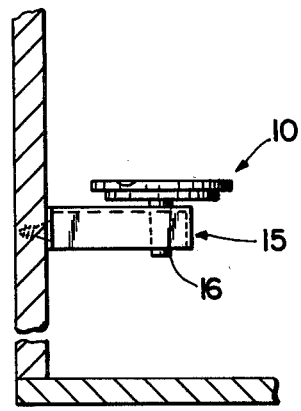
FIG. 4
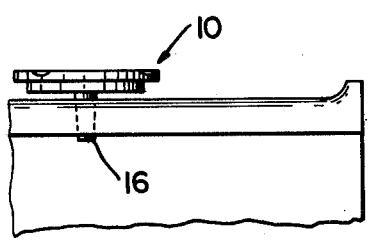
FIG. 3

SEMI-ATTACHED ASHTRAY

PRIOR ART

U.S. Pat. No. 1,894,146 is typical of the ashtray construction, and does not teach easy removal of waste.

U.S. Pat. No. 2,202,365 also does not teach easy removal.

U.S. Pat. No. 2,617,429 is not simple or inexpensive and does not control waste.

West German Pat. No. 2,327,330 shows a waste holder which is not simple or inexpensive and does not teach wall mounting.

SUMMARY OF THE INVENTION

The principal object of this invention is to provide an ashtray with a removable mount whereby the user has exact knowledge of its location at all times.

Another object of this invention is to provide control of waste in one area to minimize accidents which could lead to fire.

A further object of this invention is to allow easy removal of waste or to move the ashtray from one fixed area to another.

Still another object of this invention is to provide an ashtray supported by a bracket mounted to a wall facing.

BRIEF DESCRIPTION OF THE DRAWING (S)

FIG. 1A is a perspective view of an ashtray shown incorporating the invention.

FIG. 1B is a fragmentary perspective side view of the stem secured to ashtray by screw using wall mount of FIG. 1A.

FIG. 2 is a top view of the wall-mounted bracket from which the assembled stem and ashtray is held in FIG. 1B.

FIG. 3 is an elevational view of the invention mounted on a counter using only the assembled stem and ashtray using a counter as a bracket.

FIG. 4 is an elevational view of the invention of FIG. 1 shown mounted on a wall.

DESCRIPTION OF THE PREFERRED EMBODIMENT (S)

FIG. 1A illustrates a semiattached ashtray 10, having a flat bottom low profile receptacle portion formed of fire retardant material used to control waste in one area, and having a center hole 14.

Referring to FIG. 1B, the ashtray 10 with center hole 14 is assembled to stem 12 by screw 11, also of fire retardant material ranging in size approximately ½" long. The stem 12 is a permanent mount for ashtray 10 and is provided with a hole in the solid round rod of stem 12 within which screw 11 is secured. The arrangement is such that ashtray 10 and the assembly may be held by wall-mounted bracket 15 square in shape and formed of metal or reinforced plastic tubing approximately 3"×16" gauge to 2"×14" gauge. The bracket 15 mounts to a wall facing by flap angle or protection on each side which is bent outward and contains screw holes 13 on each center of the respective flap angle.

FIG. 2 illustrates wall-mounted bracket 15 using holes at center upper and lower sides which are approximately ⅛" larger than to the stem 12 to permit removable insertion thereof into the holes.

FIG. 3 shows the receptacle portion and the stem installed on a counter as an alternative embodiment of FIG. 1B. Installation to a counter requires drilling a hole into counter top surface to removably receive stem 12.

It will be observed in FIG. 4 that wall-mounted bracket 15 mounted on a wall facing is found having stem 12 extending beyond the bottom end of square tubing which is required to readily nest stem 12 to the upper and lower tubing as shown in FIG. 1B.

What is claimed is:

1. An ashtray adapted for removable mounting at a stationary location to control waste and comprising, in combination a receptacle assembly and a mounting bracket, said assembly including a stem, said stem being a solid rod with a first aperture at one end, a waste receptacle portion for containing waste and having a central aperture, a screw passing through said central aperture and securing received within said first aperture securingly assembling said stem to said receptacle portion at the outer surface thereof, said stem and said assembly being impervious to said waste and retaining said waste in said receptacle portion, said mounting bracket comprising an elongated tubing having a pair of diametrically opposed second apertures and a projection with a mounting aperture therein disposed at one of the ends of the tubing for securing said bracket to an external supporting wall, said stem being removably received within said pair of second apertures.

2. The ashtray defined in claim 1, wherein said receptacle assembly is supported by a counter containing a counter hole with said stem being removably received within said counter hole.

* * * * *